Aug. 19, 1958 M. CAMRAS 2,848,555

MEANS FOR RECORDING

Filed Jan. 25, 1954

Inventor
Marvin Camras
by Hill, Sherman, Meroni, Gross & Simpson Attys

United States Patent Office 2,848,555

Patented Aug. 19, 1958

2,848,555

MEANS FOR RECORDING

Marvin Camras, Chicago, Ill., assignor to Armour Research Foundation of Illinois Institute of Technology, Chicago, Ill., a corporation of Illinois Application January 25, 1954, Serial No. 405,892

2 Claims. (Cl. 179—100.2)

This invention relates to electromagnetic transducer heads for use in magnetic recorders and like equipment and to a method of operating such transducer heads.

It has been found that transients produced by switching audio or bias currents on or off, strong transients in the audio signal itself, or the presence of a magnetic field are often sufficient to produce a residual magnetization of present-day recording heads. A magnetized recording head records a D. C. flux on the tape that passes over it, and any irregularities in the tape or in the intimacy of contact between the tape and the head modulate the flux to produce noise on playback.

Present methods of head demagnetization and of detection of thorough demagnetization are laborious. Even after the head has been demagnetized, if no audio limiter is used and the maximum signal level cannot be anticipated, there is no guarantee that the head will not become remagnetized during operation and spoil the recording.

It is, therefore, an object of the present invention to provide a method and means for continuously demagnetizing the core of a magnetic recorder head during recording.

It is another object of the present invention to provide a method and means for recording wherein head core magnetization no longer contributes appreciably to noise level.

It is still another object of the present invention to provide a method and means for recording which provides reduced hysteresis loss and reduced harmonic distortion.

It is yet a further object of the present invention to provide a novel high fidelity recording head and method.

The novel features which I believe to be characteristic of my invention are set forth with particularity in the appended claims. My invention itself, however, both as to its organization and method of operation, together with further objects and advantages thereof, may be best understood by reference to the following description taken in connection with the accompanying drawings, in which:

As shown on the drawings.

Figures 1, 2, 3, 4:
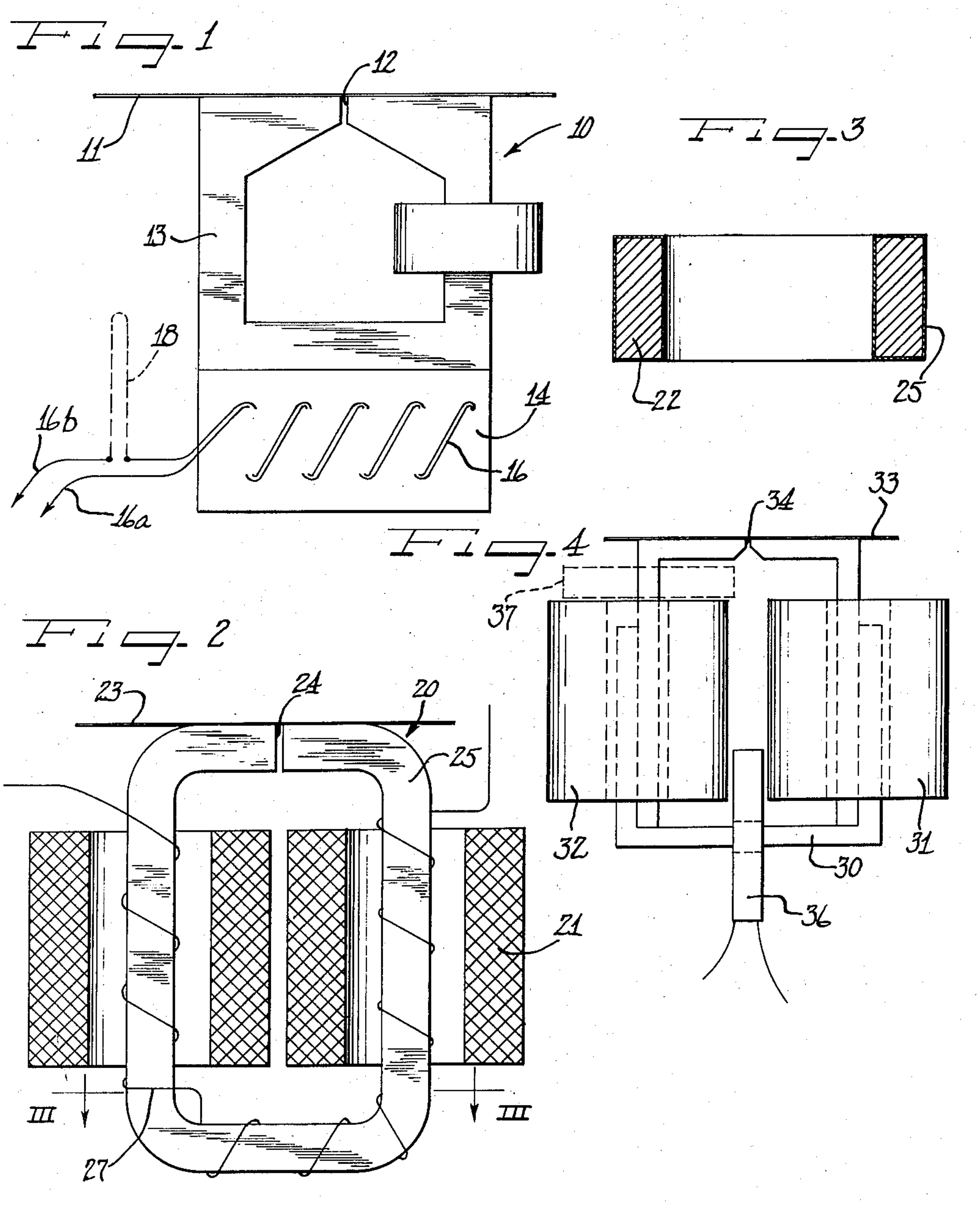
Figure 1 is a diagrammatic side elevational view of one embodiment of electromagnetic transducer head assembly according to the present invention.
Figure 2 is a diagrammatic side elevational view with certain parts in section illustrating a second embodiment of electromagnetic transducer head assembly according to the present invention.
Figure 3 is a cross-sectional view taken substantially along the line III—III of Figure 2.
Figure 4 is a diagrammatic side elevational view of a third embodiment of transducer head assembly according to the present invention.

The present invention is based on the discovery that a magnetic recording head may be continually demagnetized during a recording operation by heating the core of the head, especially while applying a bias flux to this core. By the coaction of heat and bias current, it is possible to demagnetize the head without significant adverse effects on the recording characteristics of the head.

For a recording head with a typical nickel-iron core such as mumetal or permalloy, it was found that residual magnetization could be reduced to a point where it no longer contributed appreciably to the noise level by proper selection of bias and temperature.

If maximum efficiency bias (hereafter called M. E. bias) is defined as the value of bias current for maximum audio output, and if normal operating bias (hereafter called N. O. bias) is taken to be one and one-half times M. E. bias, it was found that when a mumetal core is heated to a temperature of approximately 280° F. at N. O. bias, head magnetization effects disappeared into the background noise. Important benefits were also obtained at lower temperatures. For example, with the same head at N. O. bias and at a temperature of 160° F., it was found that the noise was reduced to only about 3 db above that of an erased tape, which was satisfactory for all except the most critical applications. With M. E. bias, the mumetal core recorded no noise above background noise at 380° F., and noise reduced to within 3 db of the erased noise by operating at 310° F.

By selecting a core material having a low Curie-point, it is possible to operate the head at even lower temperatures and still demagnetize the head. For example, with a manganese-zinc-ferrite composition (Ferroxcube) head having a Curie-point of about 230° F., if the head is heated to 150° F., it is found that the head constants do not change enough to affect the bias or the recording characteristics, but the tape noise at N. O. bias level falls to within 1 db of the erased noise. Slightly higher temperatures give even better results, but operation becomes critical as the Curie-point is approached. Unless special care is taken to insure temperature stability, it is well to operate a safe margin away from this point. The term "Curie-point" refers to the temperature at which the ferromagnetic material becomes non-magnetic.

Additionally it has been discovered that noise is reduced if the head is operated at conventional bias and at conventional temperatures near room temperature, but the core is made of a material having a Curie-point in the range of 100° F. to 150° F. A ferrite material can be fabricated to have a Curie-point within this range by known methods, but it has never been realized that the use of such a material for a recording head in conjunction with a high level of high frequency bias would effectively reduce noise level through the indirect process of lowering its ability to retain magnetization under such conditions. Certain nickel-iron alloys can be fabricated with a Curie-point in this range, notably alloys between about 30 to 45% nickel content. At the lower range of nickel content, the Curie-point is at or below room temperature, while at the higher range it may reach several hundred degrees Fahrenheit. Adjustment of composition and heat treatment to yield an alloy with Curie-point between 125° and 250° F. makes a suitable core for operation at or slightly above room temperature.

No appreciable adverse effects on the recording characteristics of the head studied were noted at elevated temperatures. However, at 380° F. it was necessary to increase the audio input about 3 db to maintain the same playback level as at room temperature, but audio and bias saturation levels of the head remained many times above the levels used in recording.

Figure 1 indicates diagrammatically a first embodiment of a magnetic recording head 10 for recording on an elongated magnetizable medium 11 travelling over a gap 12 in the core 13 of the head. For the heating the core 13 above the temperature at which a conventional head of this type normally operates, a heater element 14 is attached to the core 13 in good heat transfer relation therewith.

Heat may be generated by means of a non-inductively (bifilar) wound resistance wire 16 having input leads 16*a* and 16*b* connected across a suitable source of electric current. The energization current may be D. C., with the residual stray field balanced out by an extra coil 18 in series with the winding and orientable with respect to the head. Alternatively the energizing current can be a high frequency A. C., for example bias current, in which case a residual stray flux will not noticeably change the operation. Alternating current of power frequency (60 cycles) may be used with a balancing arrangement, and/or a playback system that is insensitive to power frequency. The non-inductive heater may be a resistance wire covered with ceramic or other high temperature insulation. It may be wound on the core itself, with provision for adjusting the turns for accurate balancing out of the heater field, or it may be wound on a separate form held against the core.

Figures 2 and 3 illustrate diagrammatically a second embodiment whereby a magnetic recording head may be heated, and in this case the head 20 has the usual voice coils 21 for inducing a signal flux in the core 22 which is applied to a magnetic record member 23 at the non-magnetic gap 24 in the core. In accordance with conventional recording practice, a high frequency bias flux is superimposed on the signal flux. According to the present invention, however, copper plating 25 is provided on the surface of the core and a high frequency bias coil 27 is wound on these parts of the core. By this structure, the copper plating provides a "shorted turn" that is in good thermal contact with the core and which heats the core due to induction from the high frequency bias winding 27.

In Figure 4 is illustrated a third embodiment of the invention wherein the core 30 has the conventional voice coils 31 and 32 for setting up a magnetic signal flux in the core 30 which is applied to the record member 33 travelling across the gap 34. In conventional recording heads, high frequency bias coils are located on the core 30, generally above the voice coils and near the gap 34 so as to induce the strongest possible flux at the gap for a given input. However, according to the present embodiment, the bias coil 36 is placed remote from the gap 34 so as to require a much greater high frequency current to set up a comparable amount of high frequency flux at the gap 34. This high frequency current serves to demagnetize the core because of the greater heat generated by the increased losses and increased flux density. Additionally, this arrangement has the effect of establishing a high frequency alternating flux density in the core which has an additional demagnetizing effect. Bias coils 36 and 37 in Figure 4 may be connected so that the fields buck each other, with the resultant giving optimum bias at the gap.

In each of the three embodiments, heating is also increased when the cores are relatively thick and of low resistivity material. Such cores are generally the most difficult to demagnetize, and so are especially benefited.

All of the forms shown have the cores preferably mounted in a retainer of low heat conductivity and surrounded by heat insulating material so that high temperature operation is attained with minimum expenditure of power.

A further discovery of the present invention is that the core may be demagnetized even at the conventional operating temperatures for conventional heads by using a core material with a Curie-point inherently somewhat above room temperature, for example in the range from 100° to 250° F., and preferably in the range from 125° to 200° F. Ferrites with this property can be manufactured by known methods as well as certain nickel-iron alloys, although materials with this Curie-point have never heretofore been used in the manner described above.

The following chart A is a summary of representative operating temperatures under varying conditions to obtain the beneficial results of the present invention.

| Material | H. F. Bias | Curie-point | Core Operating Temperature, °F. | Noise Contributed by Core Magnetization (db above background noise), db |
|---|---|---|---|---|
| 1. Ferroxcube (ferrite). | N. O | 230° F | 150 | 1 |
| 2. Nickel-iron (mumetal). | M. E | Greater than 500° F. | 380 | 0 |
| 3. Nickel-iron | M. E | Greater than 500° F. | 310 | 3 |
| 4. Nickel-iron | N. O | Greater than 500° F. | 280 | 0 |
| 5. Nickel-iron | N. O | Greater than 500° F. | 160 | 3 |

By M. E. bias is meant the bias for maximum audio output, or maximum efficiency bias. N. O. bias is taken as one and one-half times M. E. bias. The contribution of head magnetization to recorded noise level is taken in comparison to the noise level of a completely erased magnetic record member.

From chart A it will be observed that for a material having a Curie-point of the order of 230° F., if the core is heated to a temperature of 150° (80° F. below the Curie-point) or above, the noise contributed by head magnetization is reduced to a satisfactory level using normal operating bias. For heads of material having a Curie-point over 500° F., the noise level is substantially reduced if the core is heated to a temperature of 160° F. or greater at normal operating bias, or 310° F. or higher at maximum efficiency bias.

While I have shown particular embodiments of my invention, it will, of course, be understood that I do not wish to be limited thereto since many modifications may be made without departing from the spirit and scope of my invention. I, of course, contemplate by the appended claims to cover all such modifications as fall within the true spirit and scope of my invention.

I claim as my invention:

1. In a magnetic recording apparatus wherein a magnetic recording head having a magnetic core and certain functional components are required for carrying out the recording process, energization of said functional components causing said magnetic core to be heated, the improvement characterized by means for establishing an alternating flux in said core and heating means associated with said core and separate from the functional components for supplying heat to said core over and above that caused by energization of said functional components.

2. In a magnetic recording apparatus wherein a magnetic recording head having a magnetic core and certain functional components are required for carrying out the recording process, energization of said functional components causing said magnetic core to be heated, the improvement characterized by means for establishing an alternating flux in said core and heating means associated with said core and separate from the functional components for supplying heat to said core over and above that caused by energization of said functional components, and said heating means having the sole function of heating said magnetic core.

References Cited in the file of this patent

UNITED STATES PATENTS

| | | |
|---|---|---|
| 1,828,189 | Kiliani | Oct. 20, 1931 |
| 1,828,190 | Kiliani | Oct. 20, 1931 |
| 2,653,189 | Camras | Sept. 22, 1953 |
| 2,677,019 | Buhrendorf | Apr. 27, 1954 |